US010652271B2

(12) United States Patent
Osterweil et al.

(10) Patent No.: US 10,652,271 B2
(45) Date of Patent: May 12, 2020

(54) DETECTING AND REMEDIATING HIGHLY VULNERABLE DOMAIN NAMES USING PASSIVE DNS MEASUREMENTS

(71) Applicant: VERISIGN, INC., Reston, VA (US)

(72) Inventors: Eric M. Osterweil, Fairfax, VA (US); Danny R. McPherson, Leesburg, VA (US); Matthew A. Thomas, Atlanta, GA (US); Qi Alfred Chen, Ann Arbor, MI (US)

(73) Assignee: VERISIGN, INC., Reston, VA (US)

( * ) Notice: Subject to any disclaimer, the term of this patent is extended or adjusted under 35 U.S.C. 154(b) by 272 days.

(21) Appl. No.: 15/469,404

(22) Filed: Mar. 24, 2017

(65) Prior Publication Data

US 2017/0279846 A1    Sep. 28, 2017

Related U.S. Application Data

(60) Provisional application No. 62/313,557, filed on Mar. 25, 2016.

(51) Int. Cl.
*H04L 29/06* (2006.01)
*G06F 16/2457* (2019.01)
(Continued)

(52) U.S. Cl.
CPC .... *H04L 63/1441* (2013.01); *G06F 16/24578* (2019.01); *H04L 61/1511* (2013.01);
(Continued)

(58) Field of Classification Search
CPC ............. H04L 61/1511; H04L 61/302; H04L 2463/144; H04L 63/1408; H04L 63/1441;
(Continued)

(56) References Cited

U.S. PATENT DOCUMENTS 9,197,628 B1 *  11/2015  Hastings ............. H04L 63/0254
9,560,072 B1 *   1/2017  Xu ....................... H04L 63/1416
(Continued)

FOREIGN PATENT DOCUMENTS

EP          2916525 A1     9/2015

OTHER PUBLICATIONS

Extended European Search Report dated Aug. 28, 2017, European Application No. 17163162.5, pp. 1-12.
(Continued)

*Primary Examiner* — Oleg Korsak
*Assistant Examiner* — Feliciano S Mejia
(74) *Attorney, Agent, or Firm* — MH2 Technology Law Group, LLP (57) ABSTRACT

Some embodiments provide a technique for detecting highly-vulnerable domain names and remediating associated problems. The technique can include collecting DNS data representing a requests to the DNS over a period of time and determining a subset of the DNS data representing DNS-based service discovery requests to unregistered domains over the period of time. The technique can also include, for each of the unregistered domains, determining a query ratio and a persistence ratio. The technique can also include ranking the unregistered domains according to a metric that includes the query ratios and the persistence ratios, such that a ranked list of domain names is produced and outputting an initial segment of the ranked list of domain names as the highly-vulnerable domain names. The technique can also include remediating attacks on at least one of the highly-vulnerable domain names.

20 Claims, 5 Drawing Sheets

(51) Int. Cl.
*H04L 29/12* (2006.01)
*H04L 29/08* (2006.01)

(52) U.S. Cl.
CPC .......... *H04L 63/14* (2013.01); *H04L 63/1425* (2013.01); *H04L 61/305* (2013.01); *H04L 63/0236* (2013.01); *H04L 67/02* (2013.01)

(58) Field of Classification Search
CPC ....... H04L 63/14; H04L 67/02; H04L 61/305; H04L 63/1425; H04L 16/24578; H04L 63/0236; G06F 21/552; G06F 17/3053; G06F 16/24578
USPC ...................................... 726/22, 23; 709/245
See application file for complete search history.

(56) References Cited

U.S. PATENT DOCUMENTS

| | | | | | |
|---|---|---|---|---|---|
| 9,787,778 | B2* | 10/2017 | Agarwal | ................. | H04L 67/18 |
| 2006/0075491 | A1* | 4/2006 | Lyon | ................. | H04L 29/06027 |
| | | | | | 726/22 |
| 2012/0174220 | A1* | 7/2012 | Rodriguez | .......... | H04L 63/1416 |
| | | | | | 726/23 |
| 2015/0256424 | A1* | 9/2015 | Kaliski, Jr. | ....... | G06F 17/30979 |
| | | | | | 709/224 |
| 2015/0373043 | A1* | 12/2015 | Wang | .................... | G06F 21/552 |
| | | | | | 706/12 |
| 2016/0036762 | A1* | 2/2016 | Droms | ................ | H04L 61/1511 |
| | | | | | 709/224 |
| 2017/0155667 | A1* | 6/2017 | Sobel | ................. | H04L 63/1416 |
| 2017/0195439 | A1* | 7/2017 | Dixon | ................ | H04L 61/2007 |

OTHER PUBLICATIONS

Qi Alfred Chen et al., "MitM Attack by Name Collision: Cause Analysis and Vulnerability Assessment in the New gTLD Era", 2016 IEEE Symposium on Security and Privacy, May 22, 2016, pp. 675-690.

Anonymous, "New gTLD Collision Risk Mitigation—Proposals to mitigate the collision risks between new gTLDs and existing private uses of the same strings", ICANN, Aug. 5, 2013, Retrieved from the Internet: https://www.icann.org/en/system/files/files/new-gtld-collision-mitigation-05aug13-en.pdf, pp. 1-4.

Interisle Consulting Group, "Name Collision in the DNS—A study of the likelihood and potential consequences of collision between new public gTLD labels and existing private uses of the same strings", Name Collision Study Report, Version 1.5, Aug. 2, 2013, pp. 1-197.

European Office Action dated Jan. 4, 2019, European Application No. 17163162.5, pp. 1-6.

* cited by examiner

DETECTING AND REMEDIATING HIGHLY VULNERABLE DOMAIN NAMES USING PASSIVE DNS MEASUREMENTS

CROSS REFERENCE TO RELATED APPLICATIONS

This application claims the benefit of U.S. Provisional Patent Application No. 62/313,557, filed on 25 Mar. 2016, the entire contents of which is incorporated herein by reference.

FIELD

This disclosure relates generally to cybersecurity.

BACKGROUND

A "domain name" or "domain" is a label or sequence of labels separated by dots (e.g., www.example.com). The domain name system ("DNS") is a hierarchical distributed naming system for resources provided by computer servers that are connected to the internet. It associates domain names to numeric internet protocol ("IP") addresses of internet resources, including resources managed by web hosting providers, which provide the web server computers that serve the web pages associated with domain names. The DNS thus allows computers and humans to access networked resources, including web pages, using domain names.

Domains are organized as hierarchical subdomains of the DNS root domain. The first level of domain name labels under the root domain are the top-level domains ("TLD") including generic TLDs ("gTLD") such as dot com, dot net, and dot org, and country code TLDs such as dot us. Directly below TLDs are second-level domains (SLD), e.g., "example" in www.example.com. As used herein, the term "domain" means any DNS domain, including SLDs and TLDs.

The DNS uses "resource records", which are persistently stored, formatted data structures that include information relevant to performing DNS tasks. For example, IP addresses are specified by DNS "A" or "AAAA" resource records, which include both a domain name and the associated IP address for the computer server that hosts the domain, i.e., the web hosting provider.

A DNS "registry" is an authoritative, master database of all domain names registered in a top-level domain or other domain in which domain names can be registered. A registry includes many hardware computer servers operably coupled to the internet. A registry keeps the master database and also generates a "zone file" comprising DNS resource records for the top-level domain, which allows computers to look up DNS records in the top-level domain from anywhere in the world. Internet users generally interact with the registry via intermediaries. For ease of discussion, a registry is identified with its hardware computer servers unless otherwise specified or clear from context.

Domain names can be registered by internet users known as "registrants" through many different companies known as "registrars". Registrars compete with one another to register domain names for registrants. That is, an internet user interacts with a registrar to obtain a domain name, thereby becoming a registrant for the domain. The registrar chosen by the registrant asks the registrant to provide various contact and technical information that makes up the registration. The registrar then keeps a record of the contact information and submits the technical information to the registry. For ease of discussion, a registrar is identified with its hardware computer servers unless otherwise specified or clear from context. Further, an internet user has a hardware client computer. For ease of discussion, a registrant is identified with its hardware client computer unless otherwise specified or clear from context.

SUMMARY

According to various embodiments, a computer-implemented method of detecting highly-vulnerable domain names and remediating associated problems is disclosed. The method includes collecting, electronically, domain name system (DNS) data representing a plurality of requests to the DNS by a plurality of entities over a period of time; determining a subset of the DNS data representing a plurality of DNS-based service discovery requests to unregistered domains over the period of time; for each of the unregistered domains, determining a query ratio including a ratio of DNS service discovery requests for the unregistered domain to total DNS requests for the unregistered domain over the period of time; for each of the unregistered domains, determining a persistence ratio including a ratio of distinct time segments during which DNS-based service discovery requests were made for the unregistered domain to total distinct time segments in the period of time; ranking the unregistered domains according to a metric including the query ratios and the persistence ratios, such that a ranked list of domain names is produced; outputting an initial segment of the ranked list of domain names as the highly-vulnerable domain names; and remediating attacks on at least one of the highly-vulnerable domain names.

Various optional features of the above embodiments include the following. The remediating may include refusing a request to register at least one of the highly-vulnerable domain names. The remediating may include alerting an enterprise that it is leaking DNS requests. The collecting may include passively collecting at at least one DNS server. The determining a subset may include thinning the DNS data to represent requests to unregistered incipient top level domains. The metric may further include at least one of: total query volume for each of the unregistered domains over the period of time, requesting source diversity for each of the unregistered domains over the period of time, quantity of individual labels in each of the unregistered domains, or for each of the unregistered domains, quantity of the unregistered domains including both a DNS-based service discovery label and a terminal segment of the unregistered domain. The determining a subset of the DNS data representing a plurality of DNS-based service discovery requests to unregistered domains over a period of time may include determining a subset of the DNS data representing a plurality of Web Proxy Auto-Discovery (WPAD) requests to unregistered domains over a period of time. The subset of DNS data may exclude DNS data representing requests to the DNS for domains including top level domains dot com, dot net, dot gov, dot edu, dot mil, and dot org. The ranking may include: assigning each unregistered domain a distance from a first point having coordinates including an associated query ratio and persistence ratio to a second point, such that a plurality of distances are produced; and ranking the unregistered domains according to associated distance. The initial segment of the ranked list of domain names may be determined by locating a point in a graph of the geometric distances.

According to various embodiments, a system for detecting highly-vulnerable domain names and remediating associated problems is disclosed. The system includes a network interface configured to collect, electronically, domain name system (DNS) data representing a plurality of requests to the DNS by a plurality of entities over a period of time; and at least one electronic processor configured to: determine a subset of the DNS data representing a plurality of DNS-based service discovery requests to unregistered domains over the period of time; for each of the unregistered domains, determine a query ratio including a ratio of DNS service discovery requests for the unregistered domain to total DNS requests for the unregistered domain over the period of time; for each of the unregistered domains, determine a persistence ratio including a ratio of distinct time segments during which DNS-based service discovery requests were made for the unregistered domain to total distinct time segments in the period of time; rank the unregistered domains according to a metric including the query ratios and the persistence ratios, such that a ranked list of domain names is produced; output an initial segment of the ranked list of domain names as the highly-vulnerable domain names; and remediate attacks on at least one of the highly-vulnerable domain names.

Various optional features of the above embodiments include the following. The at least one electronic processor configured to remediate may be further configured to remediate by refusing a request to register at least one of the highly-vulnerable domain names. The at least one electronic processor configured to remediate may be further configured to remediate by alerting an enterprise that it is leaking DNS requests. The network interface may be configured to passively collect the DNS data at at least one DNS server. The at least one electronic processor configured to determine may be further configured to thin the DNS data to represent requests to unregistered incipient top level domains. The metric may further include at least one of: total query volume for each of the unregistered domains over the period of time, requesting source diversity for each of the unregistered domains over the period of time, quantity of individual labels in each of the unregistered domains, or for each of the unregistered domains, quantity of the unregistered domains including both a DNS-based service discovery label and a terminal segment of the unregistered domain. The at least one electronic processor configured to determine may be further configured to determine a subset of the DNS data representing a plurality of Web Proxy Auto-Discovery (WPAD) requests to unregistered domains over a period of time. The subset of DNS data may exclude DNS data representing requests to the DNS for domains including top level domains dot com, dot net, dot gov, dot edu, dot mil, and dot org. The at least one electronic processor configured to rank may be further configured to rank by: assigning each unregistered domain a distance from a first point having coordinates including an associated query ratio and persistence ratio to a second point, such that a plurality of distances are produced; and ranking the unregistered domains according to associated distance.

According to various embodiments, at least one computer readable medium including instructions which, when executed by at least one electronic processor, cause the processor to perform a method of detecting highly-vulnerable domain names and remediating associated problems is disclosed. The instructions cause the processor to perform: collecting, electronically, domain name system (DNS) data representing a plurality of requests to the DNS by a plurality of entities over a period of time; determining a subset of the DNS data representing a plurality of DNS-based service discovery requests to unregistered domains over the period of time; for each of the unregistered domains, determining a query ratio including a ratio of DNS service discovery requests for the unregistered domain to total DNS requests for the unregistered domain over the period of time; for each of the unregistered domains, determining a persistence ratio including a ratio of distinct time segments during which DNS-based service discovery requests were made for the unregistered domain to total distinct time segments in the period of time; ranking the unregistered domains according to a metric including the query ratios and the persistence ratios, such that a ranked list of domain names is produced; outputting an initial segment of the ranked list of domain names as the highly-vulnerable domain names; and remediating attacks on at least one of the highly-vulnerable domain names.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to examples of implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

In the DNS ecosystem, the public DNS namespace is intended for the resolution of domain names on the public Internet. In this namespace, the Internet Corporation for Assigned Names and Numbers ("ICANN") is the authoritative administrator for the DNS root. ICANN delegates the management of the TLDs to specific TLD registry operators.

Outside of the public DNS namespace, a local area network can also set up an internal (e.g., for local area network) DNS namespace using private domain names. This is common practice for corporate networks to control internal data access and resolution. In an internal DNS namespace, the network administrators provision internal DNS zones and configure their internal resolvers to query these servers instead of the public DNS namespace. To prevent confusion between internal and public namespaces, the administrators usually use TLD strings that have not been delegated in the public namespace as the internal TLDs ("iTLD").

In late 2013, ICANN launched the New gTLD Program, which has delegated more than 1,000 new gTLDs in three years, making it the largest expansion of the public namespace ever. As a side effect, many popular strings that administrators used as iTLDs were now also delegated as gTLDs. Thus, some internal domain names using previously undelegated iTLD strings can now be registered in the public namespace, and these internal domain names may be described as "colliding" with the newly registered public domain names. Throughout the DNS, internal namespace queries are leaked to the public namespace every day. Potential causes of such leakage include domain hard-coding behaviors at end user devices when used outside an internal network and implementation flaws in DNS resolvers. Previously, leaked queries would not resolve in the public namespace because the iTLD was not delegated. However, with the expanded public namespace, these leaked queries can now be answered by malicious registrants that register the colliding domains in the public namespace. By exploiting these leaked queries, this name collision problem has become an attack vector.

The resolution of a domain name in an unintended namespace is known as a "name collision". One specific example of a name collision attack exploits leaked web proxy auto-discovery ("WPAD") service discovery queries. In this attack, the attacker registers a vulnerable domain that is susceptible to having WPAD query leaks to the public namespace. Since WPAD is designed for web proxy configuration, exploiting these leaks allows the attacker to set up man-in-the-middle ("MitM") proxies on end-user devices from anywhere on the Internet.

Further, in studying services such as WPAD that are vulnerable to MitM attacks as disclosed herein, the inventors discovered that the clients for one third of such services only rely on the DNS responses for server identification, with no server authentication logic. The clients for the remaining two thirds of these services use some form of server authentication by default, leveraging transport layer security ("TLS") certificates or pre-shared keys ("PSK"). However, nearly all clients using TLS certificates are found to accept any publicly valid TLS certificates for a colliding domain by default, which is obtainable for name collision attackers. For the clients using PSK, a majority were found to have no enforcement of server authentication. More specifically, even though they choose to use server authentication by default, the server side can downgrade it by suggesting not using server authentication.

Leveraging the insights that most domain names in leaked WPAD queries are transient and low-volume, this document discloses a useful characterization of the attack surface that focuses on domain names that persistently expose many victims. Such domain names are referred to herein as highly-vulnerable domains ("HVD"), because an adversary could gain more value from operating them. In particular, this document considers highly-vulnerable domains for a new TLD to be those DNS-based service discovery domains that, for example, persistently expose a large number of victims. Such domains are referred to as an "attack surface" for this new TLD. These attack surface domains, or highly-vulnerable domains, may have at least one of the following two properties, according to some embodiments: (1) high persistence, meaning that their queries are leaked to the public namespace frequently over a long time period, e.g., every day or days with regular periodicity, and (2) high query volume, indicating that once registered, many victims can be continuously exploited. Such domains are quantifiably attractive targets for adversaries and are likely to keep exposing such vulnerability after the delegation of their TLD strings.

Once the highly-vulnerable domains are identified, disclosed remediation strategies can be deployed, e.g., at the new TLD registry level, to scrutinize the registration of highly-vulnerable domains. Further, remediation may be deployed at the autonomous system level and the end user level to prevent the vulnerable queries from being leaked to the public DNS namespace.

Accordingly, the present document discloses techniques for both identifying highly-vulnerable domains and for remediating threats posed by the identified highly-vulnerable domains.

Figure 1:
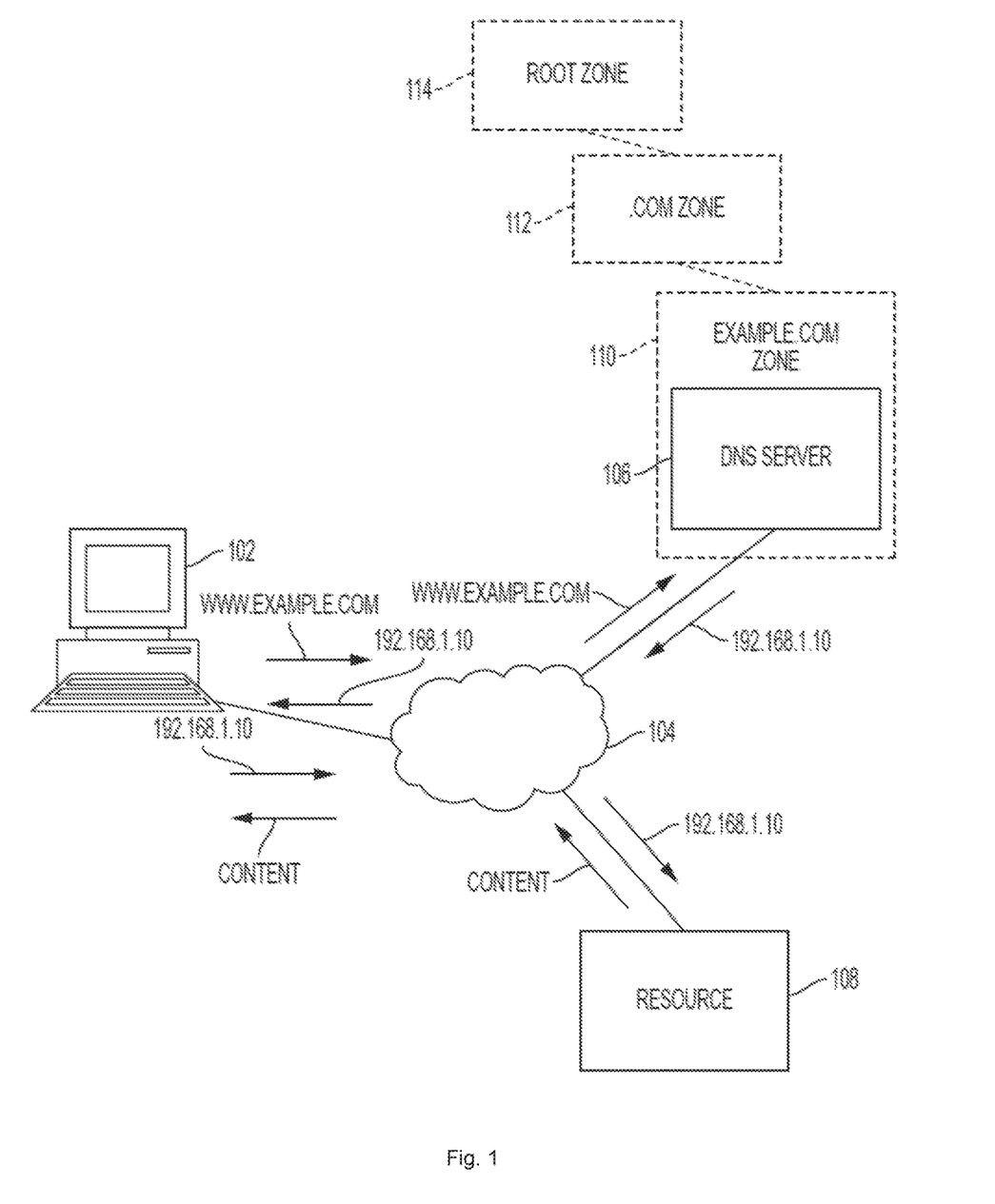
FIG. 1 is a schematic diagram depicting an example of a DNS interaction with a client.

FIG. 1 is a schematic diagram depicting, by way of background, an example of a DNS interaction. Note that the interaction depicted by FIG. 1 does not necessarily involve an embodiment of the invention, nor does it explicitly depict a MitM attack. Instead, FIG. 1 depicts an overview of one example of how DNS enables the internet to operate using domain names instead of numerical IP addresses. That is, although networked computers generally rely on numerical locators such as IP addresses, human beings are ill-equipped to memorize such locators. Accordingly, DNS enables humans to rely on easy-to-remember domain names to access resources and data. Nevertheless, the hardware and resources depicted in FIG. 1 may be adapted as disclosed herein to implement an embodiment of the present invention. In other words, FIG. 1 depicts a structure in which an embodiment may be implemented to technically improve the normal functioning of the DNS.

A user may operate client computer 102. The user may activate a URL containing a domain name, e.g., http://www.example.com, by entering it into the navigation field of a web browser executing on client computer 102 or by clicking on a link for the URL as it is displayed in the browser on a webpage or other internet resource. Client computer 102 operates and/or contacts a recursive DNS server (not shown) to look up the IP address corresponding to www.example.com. In particular, client computer 102 may send a resource record query to the recursive DNS server. For purposes of this example, the recursive DNS server lacks a resource record for www.example.com. According to the DNS protocol, the recursive DNS server may in this example query the root zone 114 for this record. By way of a DNS name server ("NS") DNS resource record, the root server points to a DNS server for the dot com zone 112, which provides an NS resource record that points to DNS server 106 for the zone for www.example.com, again, relying on an NS resource record. The DNS server 106 responds with an appropriate DNS record (e.g., A or AAAA) that includes the requested IP address. The client computer 102 receives the resource record and parses it to extract the IP address. The client computer then contacts the IP address, which leads to a resource 108, which may be a server computer, for example. The resource 108 responds with the requested data, e.g., content.

Figure 2:
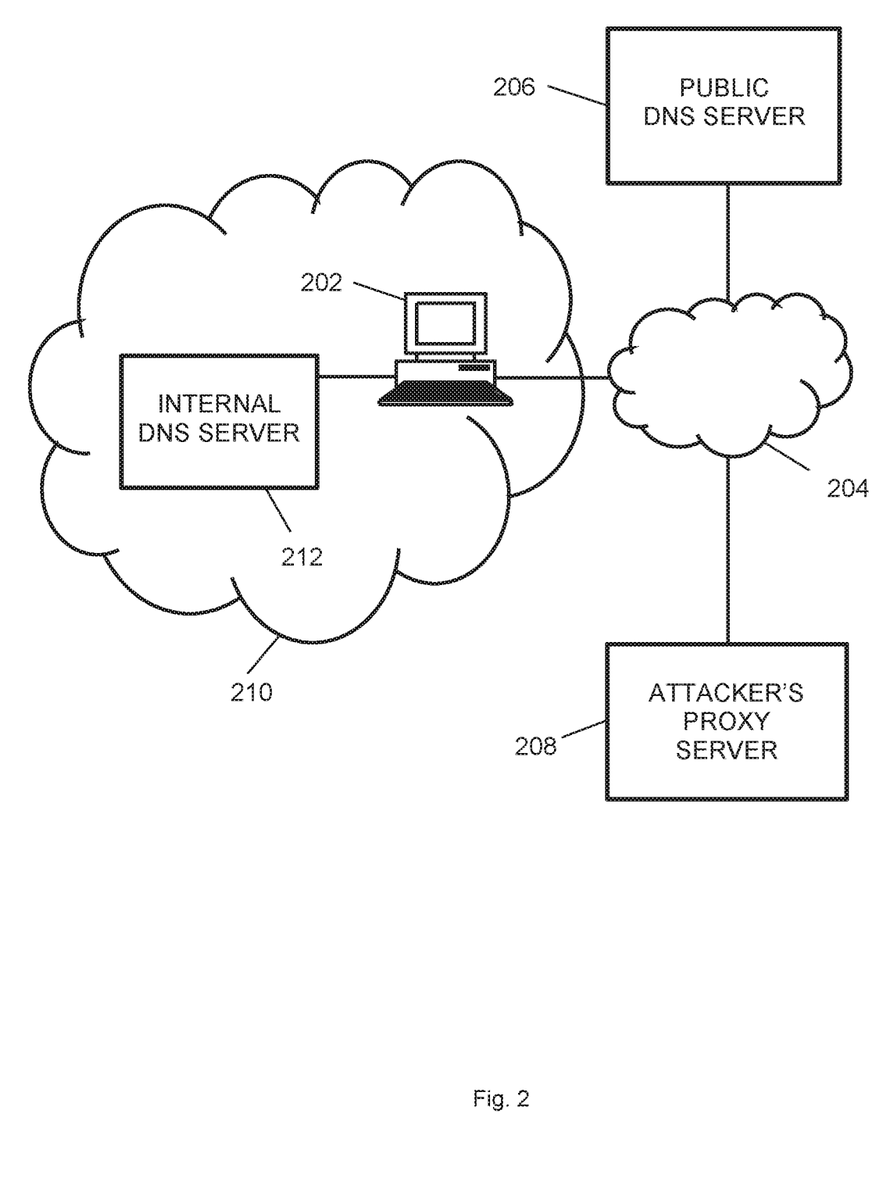
FIG. 2 is a schematic diagram illustrating a man in the middle attack launched against a DNS-based service discovery processes according to some embodiments.

FIG. 2 is a schematic diagram illustrating a MitM attack launched against a DNS-based service discovery process according to some embodiments. Thus, FIG. 2 is used to illustrate protocols that may be susceptible to exploitation as disclosed herein. In particular, the present disclosure contemplates detecting highly-vulnerable domain names susceptible to MitM attacks via a DNS-based service discovery protocol, such as WPAD. Although FIG. 2 illustrates such attacks in reference to WPAD, the disclosed techniques are not so limited. Instead, the disclosed techniques are applicable to any DNS-based service discovery protocol, not limited to WPAD.

The DNS ecosystem described above in reference to FIG. 1 is the public DNS namespace for domain names visible to the internet. FIG. 2 also depicts the internet 204 and public DNS server 205. However, FIG. 2 further illustrates client computer 202 in local area network 210, e.g., a corporate network, which includes an internal DNS namespace with private domain names. Such an internal namespace helps control the access to internal confidential information and can operate despite any external network connectivity disruption, making it a common practice for companies. To create an internal DNS namespace, internal name server 212 is used to serve the zone files for a customized internal domain and the corresponding resolvers are configured to query these servers instead of the DNS servers in the public namespace. To make the internal domain name easy to reference and also to prevent confusion between internal and public namespaces, some administrators in the past used TLD strings that have not been delegated (in the public DNS namespace) as iTLDs.

The use of iTLDs implicitly assumes that these TLD strings will not be delegated in the public namespace; however, with the launching of the ICANN's new gTLD program, many of the popular iTLD strings have already been delegated in the DNS today and are open for public registration. This breaks the implied assumption, upon which many internal local area networks are relying for proper operation, that previously undelegated iTLDs would never be delegated. One problem created as a side effect of ICANN's new gTLD program is that the leaked internal queries to these iTLD strings that were previously benign now expose the query issuers to MitM attacks as disclosed herein.

In general, WPAD is a protocol designed for browsers or operating systems to automatically locate a web proxy configuration file. It is primarily used in internal networks (e.g., local area network 210) where clients (e.g., client computer 202) are restricted from communicating to the public HTTP network (i.e., internet 204). The proxy configuration file is by default named wpad.dat, is written in proxy auto-config format, and specifies the proxy IP and port using code PROXY[IP]:[port].

To find the proxy configuration file, WPAD supports two methods: DHCP WPAD and DNS WPAD. Usually DHCP WPAD is attempted first by client computer 202 issuing a DHCP INFORM message to the local DHCP server. If the local infrastructure supports this proxy configuration, the PAC file location is included in the response. If no such configuration is found in DHCP, DNS WPAD is performed. Without an explicit configuration like that in DHCP WPAD, DNS WPAD infers the location of the proxy file based on the device domain name. For example, in a company's internal network, a corporate device can be configured with internal domain company.ntld in the operating system. In DNS WPAD proxy discovery, the proxy file location is inferred from this name and fetched using HTTP request http://wpad.company.ntld/wpad.dat, involving a DNS request for wpad.company.ntld. To serve this proxy discovery, a company can simply set up a web server with wpad.dat under its root directory, and point a DNS record for wpad.company.ntld in its local DNS zone file (e.g., stored at internal DNS server 212) to this server.

WPAD service discovery can be supported in both operating system and browser levels. The configuration is typically named "automatically detect setting" in the LAN proxy setting. DNS WPAD is supported by all popular browsers and operating systems, and some of them even use it by default, e.g., Windows operating systems and Microsoft Internet Explorer browsers. Note that for the browsers and operating systems that do not enable it by default, the local network administrator, e.g., the information technology department in a company, may enable it during the device setup process so that end devices can use its convenient proxy discovery feature. The discovery process typically starts right after the browser is launched. With a valid PAC file fetched, all subsequent web traffic is redirected to the configured proxy.

The WPAD protocol is designed to only configure proxies for end systems from within an administrative domain such as a corporate internal DNS namespace. Ideally, for a device (e.g., client computer 202) belonging to a corporate domain, it performs discovery to configure a WPAD proxy only inside that domain. While these queries may have always been vulnerable to DNS spoofing attacks, the adversaries would need to be on-path or be able to spoof DNS responses in a narrow attack window. The intended local scope of queries, the on-path requirement, and the narrow attack window have kept WPAD deceptively safe.

However, because internal queries leak to the DNS root servers 206 and internal namespaces now collide with new gTLD domains, which are both happening in large scale today, the inherent security weaknesses in WPAD are significantly easier to exploit. A typical example is a WPAD name collision attack, in which a malicious domain registrant can exploit name collisions of leaked WPAD queries and launch MitM attacks from anywhere on the internet. In this attack, victim devices (e.g., client computer 202) are assumed to be configured to use DNS WPAD for automatic proxy discovery by issuing WPAD queries in an internal DNS namespace, e.g., company.ntld. In this example to illustrate the problem, dot ntld is assumed to be used as an iTLD, and also delegated in the public DNS namespace; "ntld" is a placeholder for "new top level domain". Under some common settings, such queries are mistakenly leaked out. This allows an attacker to create name collisions for these queries by registering the domain name company.ntld in the new gTLD dot ntld. Thus, the leaked WPAD queries from affected systems (e.g., the system of LAN 202), which may be anywhere on the internet, are sent by standard DNS processing to the attacker's authoritative name server 206 and the DNS resolves the leaked WPAD queries to fetch the attacker's proxy configuration file. This causes all the subsequent web traffic in the browser or traffic from the entire operating system to be redirected to the proxy 208 controlled by the attacker. The victim user may not even recognize the attack, since the WPAD proxy discovery is fully automated at the browser launch time, and some operating systems and browsers enable it by default without explicit consent from users. The attacker can leverage this MitM position to not only eavesdrop on sensitive data such as confidential documents and user credentials, but also to manipulate the traffic to inject malicious code, launch phishing attacks, or perform other malicious acts on the vulnerable systems.

In such attacks, the adversaries only need to register new gTLD domains to direct potentially vulnerable WPAD queries to them. This means that if a potentially colliding internal domain is registered, the attacker can detect and respond authoritatively to WPAD queries without the need of spoofing. This frees the on-path requirement and eliminates the narrow attack window drawback of previous WPAD attacks. More importantly, the authoritative nature of the malicious responses makes this attack exploitable despite DNS security extensions.

This attack is also very stealthy, because once the domain name is registered, due to privacy protection in the DNS, it is difficult for both new gTLD registries and third parties to examine its subdomains for attack attempts. Note that it is not assumed that the attacker is fully aware of the set of the vulnerable domains (i.e., domains with leaked queries) and thus deliberately exploits them. The attackers can be sophisticated registrants who know some vulnerable domains based on their own analysis, e.g., by sniffing local network queries or accessing DNS traffic or accessing DNS traffic or by accessing open source intelligence data repositories such as Certificate Transparency repos that expose internal names used. Alternatively, the registrants can be non-malicious at the time that they innocently register the colliding domain, but later recognize the malicious potential and begin exploitation after observing a large number of misdirected WPAD queries. Another possibility is that the registrant is completely benign but the DNS servers are compromised by an attacker to exploit these vulnerable queries.

Figure 3:
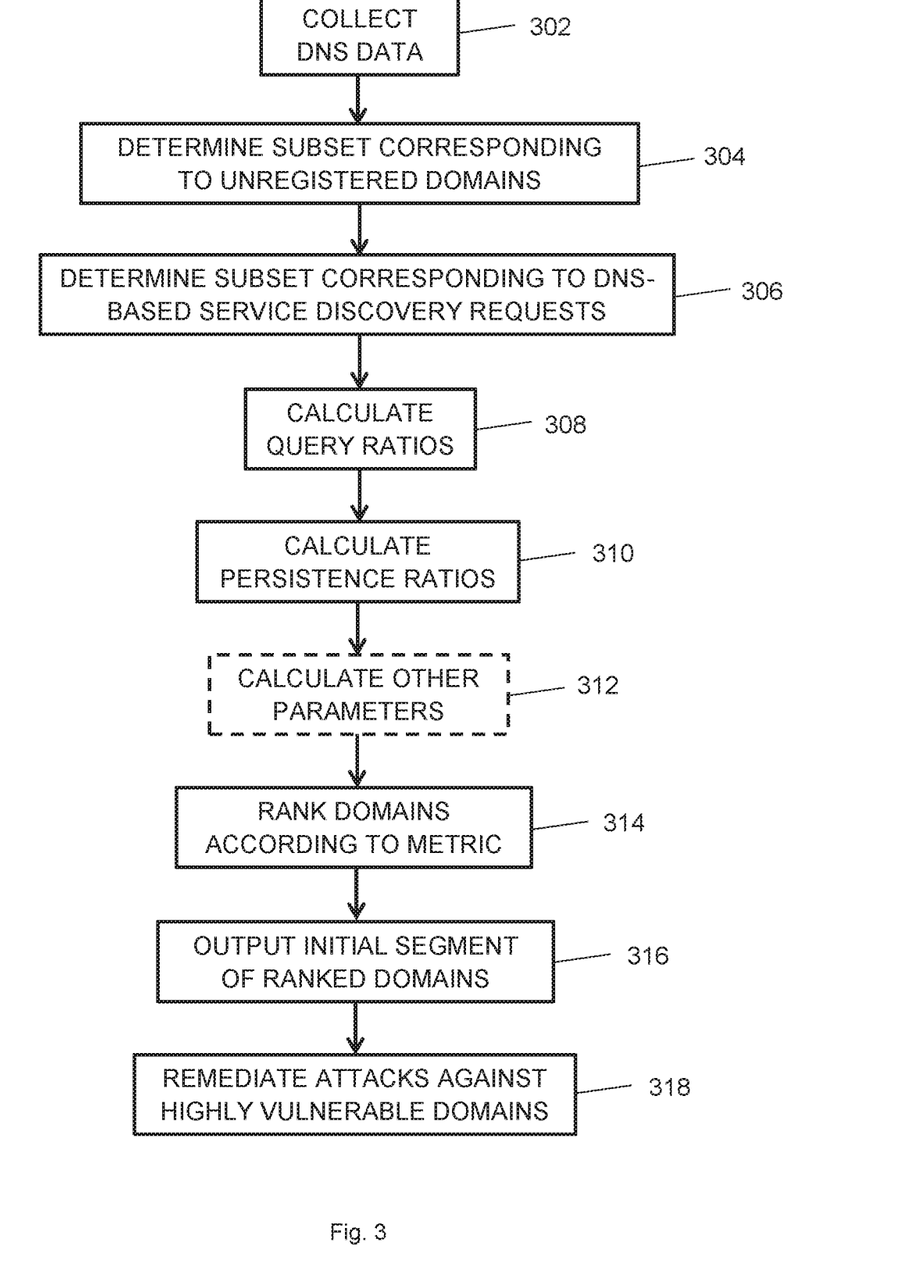
FIG. 3 is a flowchart of a technique for identifying and remediating highly-vulnerable domains according to some embodiments.

FIG. 3 is a flowchart of a technique for identifying and remediating highly-vulnerable domains according to some embodiments. The technique of FIG. 3 may be implemented at various points on a network. For example, the technique may be implemented at a DNS root server. Alternately, or in addition, the technique may be implemented at any internet-connected computer, using passive DNS measurements. Here, "passive" means that the measurements are made without disrupting DNS traffic.

At block 302, the technique collects DNS data representing requests for DNS resource records. The data collected at this stage may be comprehensive DNS data, i.e., data representing all received requests at a particular DNS server or multiple DNS servers, in raw form. Such data may then be thinned at this block by removing data that does not represent requests for DNS resource records for incipient new top level domains. Alternately, only data representing requests for DNS resource records for about-to-be-delegated new top level domains may be collected at this block. A list of new gTLD along with their delegation dates may be obtained directly from the ICANN website (http://newgtlds.icann.org/en/program-status/delegated-strings). The data representing requests for DNS resource records for about-to-be-delegated new top level domains may be collected at one or more DNS root servers, for example. The span of time over which such data is collected may range from one day to several years. Thus, at block 302, leaked iTLD-related DNS resource record requests are captured, possibly together with data representing other requests.

At block 304, the technique thins the collected data to data representing requests for DNS resource records for unregistered ("NXD") domains, if necessary. This may be performed by parsing the data acquired at block 302 to remove any data reflecting requests for DNS resource records for registered DNS domains. Note that in some embodiments, the data collected at block 302 only represents requests for incipient new TLDs that are not yet delegated. In such embodiments the thinning of the data as a separate action block is unnecessary. That is, for non-delegated iTLDs, the leaked internal namespace queries are received and replied with "NXD" by the DNS root servers, and this data may be collected directly. In the analysis of each new gTLD, some embodiments only use the data collected before a respective delegation date.

At block 306, the technique determines a subset of the DNS data corresponding to DNS-based service discovery requests. In general, name collision attacks stem from the unintentional leakage of internal DNS-based service discovery requests (e.g., WPAD DNS queries) into the public DNS namespace. Accordingly, the data set is thinned at this block to remove data representing requests other than DNS-based service discovery requests.

The thinning process may proceed by parsing the data to identify query labels used by the various DNS-based service discovery processes. That is, the WPAD proxy configuration belongs to a general class of DNS-based service discovery processes that utilize named and structured DNS records to facilitate service discovery in a discovery domain. The traditional approach for the discovery issues A or AAAA DNS queries with the service name prepended to the discovery domain. An alternate approach is to use SRV records. To discover a service (svc) over transport protocol (prot) (e.g., TCP or UDP) in a domain, for example in comp.ntld, an SRV query uses the format of _svc._prot.comp.ntld. Based on the response, the client obtains the domain name of the target server and the port number. Subsequent A or AAAA queries are issued to obtain the IP addresses of the target server. The introduction of the SRV record allows service changes in a domain to become more transparent to the client and thus increases the robustness and usability of the discovery process.

A general DNS-based discovery process is formally defined in RFC 6763. During the discovery process, a DNS pointer ("PTR") query is first issued to retrieve a list of available service instance names. For each instance name, a DNS SRV query is then issued to locate the server name and port. This mechanism reuses the query format from the aforementioned traditional SRV-based discovery process and thus the PTR and SRV queries are all in the format of _svc._prot.comp.ntld.

To standardize the discovery process, the official use of certain service names are registered in the Internet Assigned Numbers Authority (IANA) service name registry, and this data may be used to assist in parsing the DNS data. However, embodiments are not limited to consideration of registered services only; unregistered services are also contemplated.

Figure 4:
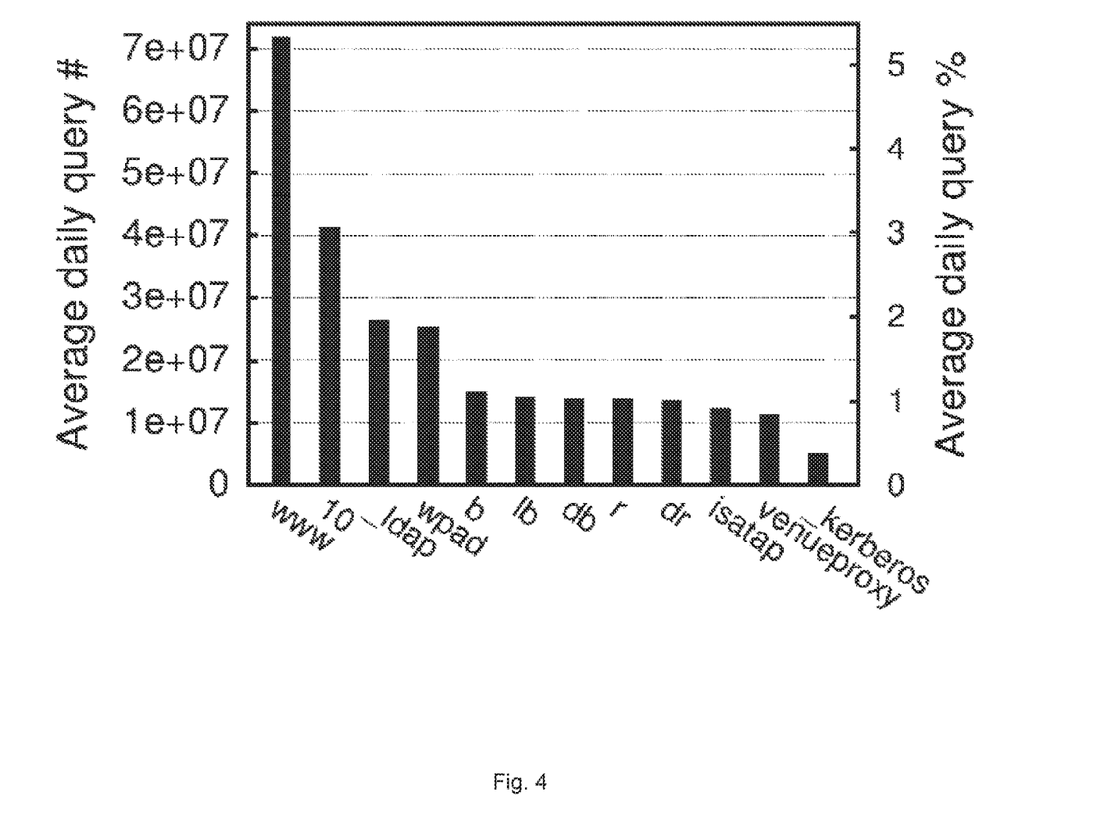
FIG. 4 depicts the most popular first labels ranked according to their average daily query numbers in non-existent domain traffic at two DNS root servers from January to July, 2015.

Refer for a moment to FIG. 4, which depicts the most popular first labels ranked according to their average daily query numbers in NXD traffic at two DNS root servers from January to July, 2015. These labels may be parsed from the query data at block 306 of FIG. 3 to distinguish data representing DNS-based service discovery requests from data representing other types of requests to thin the DNS data down to representing only NXD DNS-based service discovery requests. Note that the labels reflected in FIG. 4 include, in decreasing order of frequency: www. 10, _lpad, wpad, b, lb, db, r, dr, isatap, venueproxy, and _kerberos.

Figure 5:
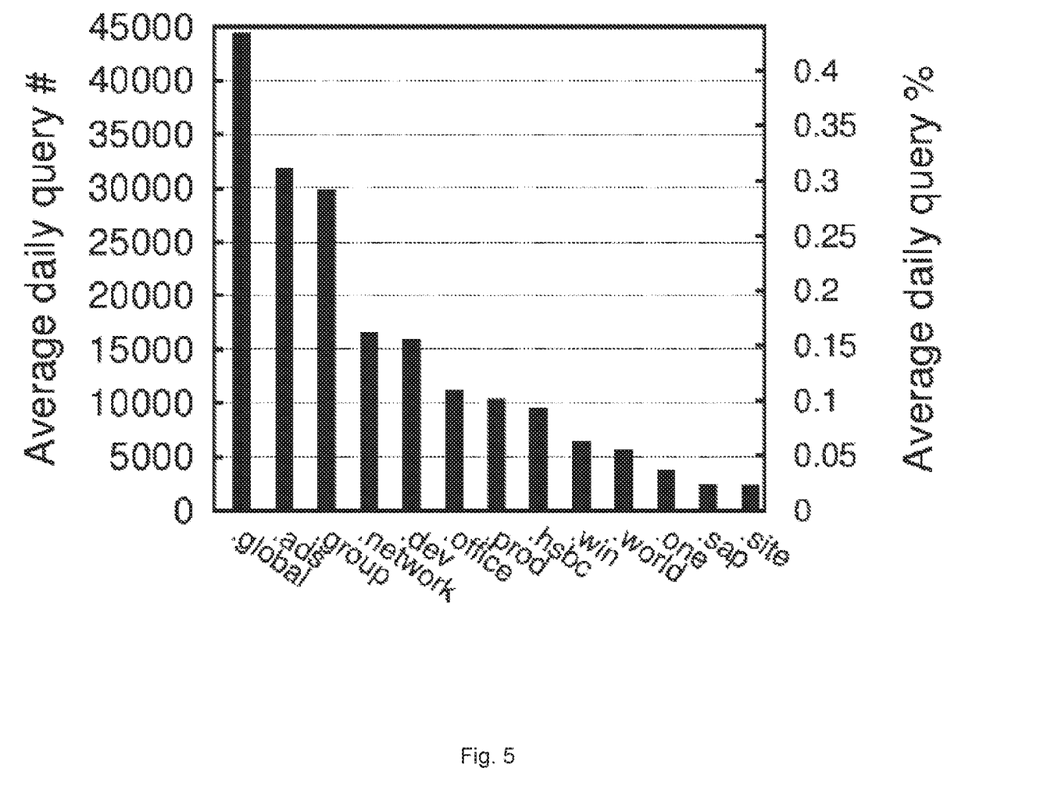
FIG. 5 depicts the most popular delegated new generic top-level domains in non-existent domain ("NXD") WPAD queries as observed in NXD traffic at two DNS root servers from January to July, 2015.

Refer now to FIG. 5, which depicts the most popular delegated new gTLDs in NXD WPAD queries as observed in NXD traffic at two DNS root servers from January to July, 2015. In particular, FIG. 5 shows the daily query volume and the overall query percentage in root NXD WPAD dataset for new gTLD strings with leaked queries.

Returning to the process of FIG. 3, at block 308, the process calculates a query ratio for each domain represented by the DNS data obtained and thinned thus far in the process. The query ratio for a domain may be defined as, for a given time period, the number of DNS-based service discovery requests for that domain divided by the total number of DNS resource record queries to that domain. The query ratios may be stored in persistent or volatile memory.

At block 310, the process calculates a persistence ratio for each domain represented by the DNS data obtained and thinned thus far in the process. The persistence ratio for a domain may be defined as, for a given time period and a given time increment that partitions the given time period, the number of distinct disjoint time increments during the total time period for which DNS-based service discovery requests for the domain were received divided by the total number of time increments in the time period. The given time period may be a week, several weeks, a month, a year, or several years, and the given time increment may be on the order of minutes, hours, or a day, for example. The persistence ratios may be stored in persistent or volatile memory.

At block 312, the process optionally (as indicated by the dashed lines) calculates additional parameters for the domains represented by the DNS data obtained and thinned thus far in the process. An example additional parameter is the total number of DNS queries for the domain for a given time period. Another example parameter is the quantity of individual labels in each domain (e.g., wpad.company.ntld has three labels, and wpad.company.us.ntld has four labels).

Yet another parameter concerns the number of DNS-based service discovery requests for the same apparent domain over a given period of time. For example, the domain company.ntld may have multiple DNS-based service discovery requests issued to DNS, such as wpad.company.ntld and _svc._prot.company.ntld. In this example, the quantity would be two. In general, the number of DNS-based service discovery requests for the same apparent domain over a given period of time can be characterized as, for a given domain, the quantity of domains represented by the DNS data obtained and thinned thus far in the process that include both a DNS-based service discovery label and a terminal segment of the given domain.

Other parameters are measures of network diversity, such as the total number of distinct IP addresses that issued DNS queries for the domain for a given time period, the total number of distinct subnets that issued DNS queries for the domain for a given time period, or the total number of distinct autonomous system numbers ("ASN") that issued DNS queries for the domain for a given time period.

Other parameters may also be calculated at this block.

At block 314, the process ranks the domains represented by the DNS data obtained and thinned thus far in the process. The metric utilized may be any of a variety that are suitable for this task. As a first example, the metric may consider the query ratios and persistence ratios as coordinates in an ordered pair, and compute the geometric distance from the origin to such ordered pair. This may be expressed as follows, by way of a non-limiting example:

$$M_1(d) = \sqrt{Q^2 + P^2}$$

In the above equation, $M_1(d)$ is the value of the metric $M_1$ applied to domain d, the quantity Q represents the query ratio for domain d, and the quantity P represents the persistence ratio for the domain d. The closer to the point (1,1), the more vulnerable the domain. Likewise, the farther from the origin, (0,0), the more vulnerable the domain.

Alternate metrics may be used. For example, additional parameters may be incorporated into a geometric distance metric. For example, a metric may consider the total number of different IP addresses that queried DNS for a given domain. Because this quantity can take on any integer value from zero to infinity, this quantity may be scaled or normalized for inclusion in a distance-related metric. Thus, a metric that accounts for IP address diversity may be expressed as follows, by way of a non-limiting example:

$$M_2(d) = \sqrt{Q^2 + P^2 + \log^2(N)}$$

In the above equation, $M_2(d)$ is the value of the metric $M_2$ applied to domain d, the quantity Q represents the query ratio for domain d, the quantity P represents the persistence ratio for the domain d, and the quantity N represents the total number of IP addresses that queried DNS for domain d in the given time period. The closer to the point (1,1,1), the more vulnerable the domain. Likewise, the farther from the origin, (0,0,0), the more vulnerable the domain.

Many other metrics and parameters may be employed. For example, any metric may include weights that serve to favor one parameter over another. Thus, a suitable metric may be expressed as follows, by way of non-limiting example:

$$M_3(d) = \sqrt{w_1 Q^2 + w_2 P^2}$$

In the above equation, $M_3(d)$ is the value of the metric $M_3$ applied to domain d, the quantity Q represents the query ratio for domain d, the quantity P represents the persistence ratio for the domain d, and $w_1$ and $w_2$ are non-negative weights applied to the constituent parameters. As with the other metrics, the closer to the point (1,1), the more vulnerable the domain. Likewise, the farther from the origin, (0,0), the more vulnerable the domain.

In general, other metrics that determine distance or similarity measurements may be used, not limited to those explicitly set forth above. For example, suitable metrics include, but are not limited to, Euclidean distance measurements, weighted-Euclidean distance measurements, or cosine similarity.

Regardless as to which metric is employed at block 314, that block applies such metric and ranks the domains according to the metric. Thus, the domains are ordered, e.g., from least vulnerable to most vulnerable, that is, from smallest metric value to largest metric value.

At block 316, the process outputs an initial segment of the domains ranked per block 314. The initial segment includes the most vulnerable domain, as determined by the largest metric value of the metric used at block 314, followed by the next most vulnerable domain, etc. There are several ways to determine a cutoff point of the initial segment. According to some embodiments, the cutoff point may be after a fixed number of domains, e.g., five domains, ten domains, etc. According to some embodiments, the cutoff may be determined by determining an inflection point or other elbow in the graph of the metric values for the ranked domains. That is, the set of pairs (x,y) where the value x is a rank of a domain and the value y is the corresponding metric value define a curve in two-dimensional space. Such a curve may be subjected to a calculus first (and possibly second) derivative, and an inflection point on the curve may be obtained using known techniques. The inflection point may serve as a cutoff value that defines an initial segment of the ranged domains.

The initial segment of ranked domains may be output in a variety of ways. For example, the initial segment of domains may be output by causing them to be displayed on a computer monitor. Alternately, or in addition, the initial segment of ranked domains may be output by being automatically emailed to an individual or individuals. Alternately, or in addition, the initial segment of ranked domains may be output by being posted to a website, for example. Regardless as to how the initial segment of ranked domains is output, it may be output in a way that presents the domains in human-readable form, e.g., as a list, or machine-readable form, e.g., in an extensible markup language ("XML") file.

The output domains in the initial segment per block 316 are considered highly-vulnerable domains. Examples determined during development of the invention include: root-.local, corp.local, prod.dca, us.local, datacenters.ww, and root.corp. Note that these examples are specific to the initial data set acquired per block 302; other implementations may determine other domains to be highly vulnerable.

At block 318, the process institutes remediation measures for the domains output at block 316. There are many types of remediation that are suitable. Remediation measured may be classified as those implemented by registries for the new TLDs, those implemented by autonomous systems that may be victims (i.e., those systems that relied on the original iTLDs), and those implemented by end users.

New TLD registries, especially the ones found to have a large attack surface, can perform remediation by ensuring that the highly-vulnerable domains are not registered, or by treating them more carefully and implementing policies to scrutinize their registrations. Some embodiments reserve the registrations of all domains seen in NXD traffic. Some embodiments permit registration of the highly-vulnerable domains by preventing their registrations until after a 90-day controlled interruption period has passed, instead of blocking them forever. Some embodiments scrutinize registration requests for highly-vulnerable domains. Such scrutiny may include requiring enhanced contact information from the registrant, such as multiple telephone numbers and physical mailing addresses, each of which may be subjected to testing for authenticity before proceeding with registration.

Autonomous systems that could become victims of the problems described herein may implement remediation measures by preventing domain name query leaks to the public namespace. Each victim autonomous system can distribute a black list of vulnerable domains to their DNS resolvers, and filter the queries to these domains before sending them to the public namespace. To create such a list for all autonomous systems, one approach is to find the common vulnerable domains using the intersection set of the attack surface domains for the victim autonomous systems. To increase the effectiveness, each victim autonomous system may customize its black lists based on their own query traffic patterns. This can be enabled by DNS traffic monitoring and filtering. One candidate approach to create such list is to use the attack surface quantification method described with respect to the metric of block 314. Victim autonomous system level filtering can also be IP based. In the WPAD discovery process, by way of a non-limiting example, the leaked WPAD queries are intended to return internal proxy server IP addresses, while in the WPAD name collision attack, the attacker needs to return public proxy IP addresses. Thus, victim autonomous system resolvers can prevent the attack by filtering the DNS responses that have public IP addresses.

End users may implement remediation measures by preventing leaks in the first place. If a WPAD proxy discovery service (or any other DNS-based service discovery) is not actually used in an internal network, the local network administrator, e.g., the IT department in a company, may disable this feature in the supported browsers and operating systems during a corporate device setup process. To more efficiently enforce this policy without the need of enumerating the configurations of all installed browsers or other related software, the administrator can change operating-system-level domain name mapping files, such as /etc/hosts, to map all permutations of WPAD URLs (or URLs for other DNS-based service discovery processes) within the internal namespace to 127.0.0.1. For the corporate devices that depend on WPAD for internal network proxy discovery, the WPAD feature in operating systems and browsers may still be enabled. To prevent WPAD query leaks for these devices, companies or other entities with internal domains may stop hardcoding the internal domain search list on their devices. If the Windows operating system is used, they may stop setting the Windows PC domain and also upgrade their operating systems.

Another end-user-level solution is an operating-system-level daemon that can filter queries based on the network environment may be implemented. Such a daemon may be implemented as a background process that intercepts DNS queries issued by all applications on the device and correctly identifies and filters queries with domains not belonging to the current network environment. In order to distinguish unintended queries, it may track the network environment at each network status change and store a list of intended domain suffixes for each network environment, either by learning from DHCP configuration messages, or by directly being configured by the user.

To help facilitate the remediation deployment process, operating systems and browsers can displaying warning messages after detecting potential name collision risks. For example, if an issued WPAD query (or other DNS-based service discovery process query) is leaked to the public namespace, the response may include a special IP address 127.0.53.53, during a 90-day controlled interruption period. Browsers and operating systems can thus leverage this to display risk warnings and recommend the users to consult their IT department immediately to resolve the problem.

Certain embodiments can be implemented or performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer-implemented method of detecting highly-vulnerable domain names and remediating associated problems, the method comprising:

collecting, electronically, domain name system (DNS) data representing a plurality of requests to the DNS by a plurality of entities over a period of time;

determining a subset of the DNS data representing a plurality of DNS-based service discovery requests to unregistered domains over the period of time, wherein at least one of the unregistered domains corresponds to a domain of an internal namespace;

for each of the unregistered domains, determining a query ratio comprising a ratio of DNS service discovery requests for the unregistered domain to total DNS requests for the unregistered domain over the period of time;

for each of the unregistered domains, determining a persistence ratio comprising a ratio of distinct time segments during which DNS-based service discovery requests were made for the unregistered domain to total distinct time segments in the period of time;

ranking the unregistered domains according to a metric comprising the query ratios and the persistence ratios, whereby a ranked list of domain names is produced;

outputting an initial segment of the ranked list of domain names as the highly-vulnerable domain names; and remediating attacks on at least one of the highly-vulnerable domain names.

2. The method of claim 1, wherein the remediating comprises refusing a request to register at least one of the highly-vulnerable domain names.

3. The method of claim 1, wherein the remediating comprises alerting an enterprise that it is leaking DNS requests.

4. The method of claim 1, wherein the collecting comprises passively collecting the DNS data at at least one DNS server.

5. The method of claim 1, wherein the determining the subset of the DNS data comprises thinning the DNS data to represent requests to unregistered incipient top level domains.

6. The method of claim 1, wherein the metric further comprises at least one of: total query volume for each of the unregistered domains over the period of time, requesting source diversity for each of the unregistered domains over the period of time, quantity of individual labels in each of the unregistered domains, or for each of the unregistered domains, quantity of the unregistered domains comprising both a DNS-based service discovery label and a terminal segment of the unregistered domain.

7. The method of claim 1, wherein the determining the subset of the DNS data representing a plurality of DNS-based service discovery requests to unregistered domains over a period of time comprises determining a subset of the DNS data representing a plurality of Web Proxy Auto-Discovery (WPAD) requests to unregistered domains over a period of time.

8. The method of claim 1, wherein the subset of DNS data excludes DNS data representing requests to the DNS for domains comprising top level domains dot com, dot net, dot gov, dot edu, dot mil, and dot org.

9. The method of claim 1, wherein the ranking comprises:
assigning each unregistered domain a distance from a first point having coordinates comprising an associated query ratio and persistence ratio to a second point, whereby a plurality of distances are produced; and
ranking the unregistered domains according to associated distance.

10. The method of claim 9, wherein the initial segment of the ranked list of domain names is determined by locating a point in a graph of geometric distances.

11. A system for detecting highly-vulnerable domain names and remediating associated problems, the system comprising:

a network interface configured to collect, electronically, domain name system (DNS) data representing a plurality of requests to the DNS by a plurality of entities over a period of time; and at least one electronic processor configured to:
determine a subset of the DNS data representing a plurality of DNS-based service discovery requests to unregistered domains over the period of time, wherein at least one of the unregistered domains corresponds to a domain of an internal namespace;

for each of the unregistered domains, determine a query ratio comprising a ratio of DNS service discovery requests for the unregistered domain to total DNS requests for the unregistered domain over the period of time;

for each of the unregistered domains, determine a persistence ratio comprising a ratio of distinct time segments during which DNS-based service discovery requests were made for the unregistered domain to total distinct time segments in the period of time;

rank the unregistered domains according to a metric comprising the query ratios and the persistence ratios, whereby a ranked list of domain names is produced;

output an initial segment of the ranked list of domain names as the highly-vulnerable domain names; and remediate attacks on at least one of the highly-vulnerable domain names.

12. The system of claim 11, wherein the at least one electronic processor configured to remediate is further configured to remediate by refusing a request to register at least one of the highly-vulnerable domain names.

13. The system of claim 11, wherein the at least one electronic processor configured to remediate is further configured to remediate by alerting an enterprise that it is leaking DNS requests.

14. The system of claim 11, wherein the network interface is configured to passively collect the DNS data at at least one DNS server.

15. The system of claim 11, wherein the at least one electronic processor configured to determine is further configured to thin the DNS data to represent requests to unregistered incipient top level domains.

16. The system of claim 11, wherein the metric further comprises at least one of: total query volume for each of the unregistered domains over the period of time, requesting source diversity for each of the unregistered domains over the period of time, quantity of individual labels in each of the unregistered domains, or for each of the unregistered domains, quantity of the unregistered domains comprising both a DNS-based service discovery label and a terminal segment of the unregistered domain.

17. The system of claim 11, wherein the at least one electronic processor configured to determine is further configured to determine a subset of the DNS data representing a plurality of Web Proxy Auto-Discovery (WPAD) requests to unregistered domains over a period of time.

18. The system of claim 11, wherein the subset of DNS data excludes DNS data representing requests to the DNS for domains comprising top level domains dot com, dot net, dot gov, dot edu, dot mil, and dot org.

19. The system of claim 11, wherein the at least one electronic processor configured to rank is further configured to rank by:

assigning each unregistered domain a distance from a first point having coordinates comprising an associated query ratio and persistence ratio to a second point, whereby a plurality of distances are produced; and ranking the unregistered domains according to associated distance.

20. At least one non-transitory computer readable medium comprising instructions which, when executed by at least one electronic processor, cause the processor to perform a method of detecting highly-vulnerable domain names and remediating associated problems by:

collecting, electronically, domain name system (DNS) data representing a plurality of requests to the DNS by a plurality of entities over a period of time;

determining a subset of the DNS data representing a plurality of DNS-based service discovery requests to unregistered domains over the period of time, wherein at least one of the unregistered domains corresponds to a domain of an internal namespace;

for each of the unregistered domains, determining a query ratio comprising a ratio of DNS service discovery requests for the unregistered domain to total DNS requests for the unregistered domain over the period of time;

for each of the unregistered domains, determining a persistence ratio comprising a ratio of distinct time segments during which DNS-based service discovery requests were made for the unregistered domain to total distinct time segments in the period of time;

ranking the unregistered domains according to a metric comprising the query ratios and the persistence ratios, whereby a ranked list of domain names is produced;

outputting an initial segment of the ranked list of domain names as the highly-vulnerable domain names; and remediating attacks on at least one of the highly-vulnerable domain names.

* * * * *